United States Patent [19]

Cavil et al.

[11] 4,227,132

[45] Oct. 7, 1980

[54] THYRISTOR INTERLOCK AND INDICATOR LIGHT CIRCUIT FOR ELECTRIC VEHICLES

[75] Inventors: David T. Cavil, Menomonee Falls, Wis.; Gerald N. McAuliffe, Lincoln, Nebr.

[73] Assignee: Outboard Marine Corporation, Waukegan, Ill.

[21] Appl. No.: 3,250

[22] Filed: Jan. 15, 1979

Related U.S. Application Data

[63] Continuation of Ser. No. 876,222, Feb. 9, 1978, abandoned.

[51] Int. Cl.² .............................................. B60L 3/00
[52] U.S. Cl. ..................................... 318/549; 74/850; 180/271; 318/139; 318/490
[58] Field of Search ....................... 318/490, 139, 549; 192/0.084; 123/179 K; 74/850; 340/54, 667; 361/193, 189; 180/82 R, 82 A, 271; 307/9 R, 10 R

[56] References Cited

U.S. PATENT DOCUMENTS

| 3,649,896 | 3/1972 | Mason et al. | 318/549 |
|---|---|---|---|
| 3,659,113 | 4/1972 | Wagner | 307/9 |
| 3,726,265 | 4/1973 | Howard | 192/0.084 |
| 3,827,540 | 8/1974 | Bolinger | 192/0.084 |
| 3,964,444 | 6/1976 | Hemmann et al. | 180/82 R |
| 4,051,915 | 10/1977 | Behrens | 180/82 A |

*Primary Examiner*—David Smith, Jr.
*Attorney, Agent, or Firm*—Michael, Best & Friedrich

[57] ABSTRACT

Disclosed herein is a thyristor interlock circuit for energizing a DC motor, the circuit comprising a solenoid switch including an actuating coil, the solenoid switch and the motor being connected in series relation between the opposed terminals of the DC source, a thyristor having an anode, a cathode, and a gate, an ignition switch which connects the anode to one terminal of the DC source, a start switch normally biased to an open position, the start switch being linked to close after closing of the ignition switch, the start switch being connected to the one terminal of the DC source and to the gate, a resistor for limiting the gate current, a controller having a switch with two terminals, and a sub-circuit comprising a first lead including a first resistor and connecting the first resistor and the actuating coil in series relation between the thyristor cathode and the other terminal of the DC source, a second lead connecting one terminal of the controller switch to the start switch and the gate, a third lead connecting the other terminal of the controller switch to the first lead between the first resistor and the actuating coil, a fourth lead including a second resistor and a diode connected in parallel relation, the fourth lead connecting the resistor between the gate and the thyristor cathode, and connecting the cathode of the diode to the gate and the anode of the diode to the thyristor cathode, the sub-circuit forcing an operator to close the ignition switch and the start switch in order to gate the thyristor and then to close the controller switch in order to energize the actuating coil and the DC motor. Also disclosed herein is an interlock circuit modified to include indicator lights and to force an indicator light check.

14 Claims, 4 Drawing Figures

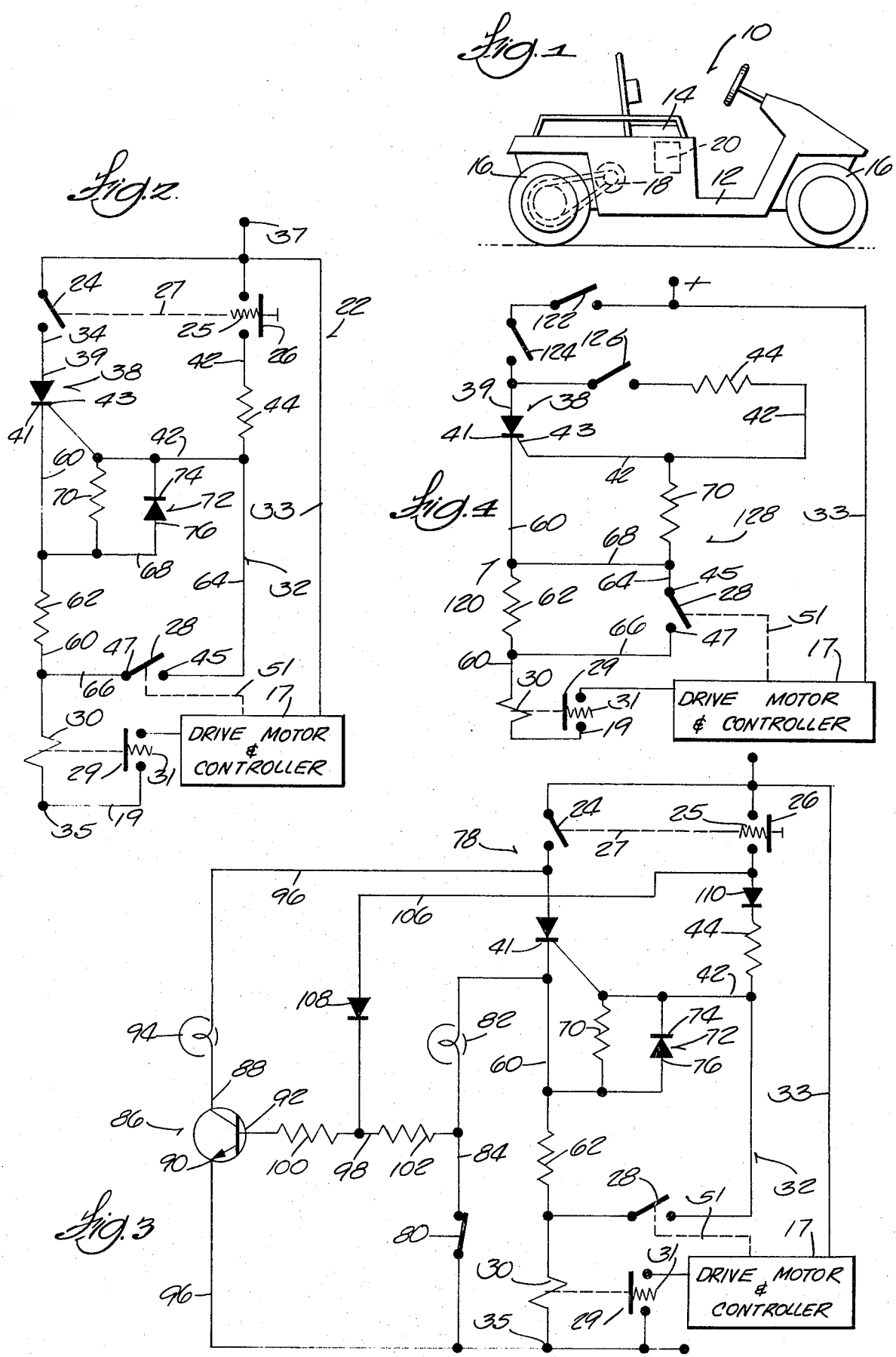

THYRISTOR INTERLOCK AND INDICATOR LIGHT CIRCUIT FOR ELECTRIC VEHICLES

This is a continuation of application Ser. No. 876,222, filed Feb. 9, 1978, now abandoned.

BACKGROUND OF THE INVENTION

The invention relates to vehicles driven by direct current electric motors and more particularly, to interlock and indicator light circuits for regulating the method of energizing DC motors powering vehicles such as golf carts or light industrial vehicles.

Attention is directed to the following United States patents:
- Miyake U.S. Pat. No. 3,818,291 issued June 18, 1974
- Anderson U.S. Pat. No. 3,826,959 issued July 30, 1974
- Delaney U.S. Pat. No. 3,902,105 issued Aug. 26, 1975

SUMMARY OF THE INVENTION

The invention provides a thyristor interlock circuit for energizing a DC motor, which circuit comprises a solenoid switch including an actuating coil, means for connecting the solenoid switch and the motor in series relation between the terminals of a DC source, a thyristor having an anode, a cathode, and a gate, means for connecting the anode to one terminal of the DC source, a first switch, means for connecting the first switch to the one terminal of the DC source and to the gate, a second switch including two terminals, and sub-circuit means connected in circuit with the thyristor and the actuating coil and the first and second switches for forcing an operator to sequentially close the first and second switches in order to energize the motor.

In one embodiment of the invention, the sub-circuit means is for connecting the cathode and the actuating coil in series relation to the other terminal of the DC source, and for connecting one terminal of the second switch to the first switch and the gate, and for connecting the other terminal of the second switch to the cathode and the actuating coil, the sub-circuit means forcing an operator to sequentially close the first switch in order to gate the thyristor and close the second switch in order to energize the actuating coil and the DC motor.

In one embodiment in accordance with the invention, the sub-circuit means comprises a first lead including a first resistor connecting the actuating coil in series relation between the thyristor cathode and the other terminal of the DC source, a second lead connecting the one terminal of the second switch to the first switch and the gate, a third lead connecting the other terminal of the second switch to the first lead between the first resistor and the actuating coil, and a fourth lead including a second resistor and a diode connected in parallel relation, the fourth lead connecting the second resistor between the gate and the thyristor cathode, and connecting the cathode of the diode to the gate and the anode of the diode to the thyristor cathode.

In one embodiment in accordance with the invention, the means for connecting the thyristor anode to the one terminal of the DC source includes an ignition switch connected in series between the anode and the one terminal of the DC source, the means for connecting the first switch to the one terminal of the DC source and to the gate includes resistance means for limiting the gate current, and the first switch comprises a start switch linked to the ignition switch to close after closing of the ignition switch, the start switch being normally biased to an open position, and the second switch comprises a switch in a vehicle controller, whereby the circuit prevents energizing the motor by closing the controller switch, unless the ignition switch is closed and the start switch has been closed before the controller switch is closed.

In one embodiment in accordance with the invention, the first switch comprises a switch linked to a vehicle transmission so as to be open when the vehicle is enabled in reverse, and so as to be closed when the vehicle is not enabled in reverse, whereby the circuit forces as operator to shift the transmission from reverse into forward or neutral and close the second switch in order to energize the DC motor.

In one embodiment in accordance with the invention, the interlock circuit is modified to include indicator lights and to force an indicator light check, the circuit further comprising a third switch normally closed when a given vehicle condition is satisfied, a first light, means for connecting the third switch and the first light in series relation between the thyristor cathode and the other terminal of the power source, a transistor including a collector, an emitter and a base, a second light, means for connecting the second light in series relation with the collector and the emitter between the ignition switch and the other terminal of the power source, and second sub-circuit means for connecting the base to the start switch and to the first light so that the transistor and the first and second lights turn on when the ignition switch and the start switch are closed, so that the second light and transistor turn off when the start switch is thereafter opened, and so that the third switch and the first light turn off and the transistor and the second light turn on when the third switch opens and the given vehicle condition is not satisfied, the second light thereby indicating an abnormal vehicle condition during operation of the DC motor.

In one embodiment in accordance with the invention, a thyristor interlock circuit for energizing a DC motor is provided, which circuit comprises a solenoid switch including an actuating coil, means for connecting the solenoid switch and the motor in series relation between the terminals of a DC source, a thyristor having an anode, a cathode, and a gate means including a first switch connected in series relation between the anode and one terminal of the DC source, a transmission switch linked to a vehicle transmission so as to be open when the vehicle is enabled in reverse and so as to be closed when the vehicle is not enabled in reverse, means for connecting the transmission switch to the one terminal of the DC source and to the gate, a controller switch including two terminals, and subcircuit means for connecting the cathode and the actuating coil in series relation to the other terminal of the DC source, and for connecting one terminal of the controller switch through a resistor to the switch and to the gate, and for connecting the other terminals of the controller switch to the cathode and the actuating coil, the subcircuit means forcing an operator to close the first switch and to shift from reverse into forward or neutral in order to gate the thyristor and to close the controller switch in order to energize the actuating coil and the DC motor.

One of the principal features of the invention is the provision of a thyristor interlock circuit for an electric vehicle which forces an operator to sequentially activate a start switch and a switch in a controller in order to energize the DC motor and drive the vehicle.

Another of the principal features of the invention is the provision of another thyristor interlock circuit including a seat switch and a transmission switch connected in circuit so as to force an operator to be seated and operate the transmission switch so that the vehicle is not enabled in reverse in order to energize the DC motor.

Another of the principal features of the invention is the provision of a thyristor interlock and indicator light circuit which includes the features first described, and which further includes indicator lights which indicate a normal and an abnormal vehicle condition, and which forces a check of the indicator lights before the DC motor is energized.

Other features and advantages of the embodiments of the invention will become known by reference to the following general description, claims and appended drawings.

IN THE DRAWINGS

FIG. 1 is a diagramatic view of a vehicle embodying various features of the invention.

FIG. 2 is a schematic view of a thyristor interlock circuit for a direct current motor embodied in the vehicle shown in FIG. 1.

FIG. 3 is a schematic view of an alternative embodiment of the invention wherein the interlock circuit is modified to include indicator lights and to force an indicator light check.

FIG. 4 is a schematic view of another alternative embodiment of the invention wherein the interlock circuit is modified to include a seat switch and a transmission switch to prevent energizing the direct current motor unless the vehicle has been shifted by a seated operator into neutral or forward from reverse.

Before explaining the embodiments of the invention in detail, it is to be understood that the invention is not limited in its application to the details of construction and the arrangement of components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

GENERAL DESCRIPTION

Shown in FIG. 1 is a vehicle 10 including a frame 12 which includes a seat 14 and which is supported on a set of wheels 16 driven by a direct current electric motor 18 which is electrically connected to a source of direct current, such as one or more batteries 20, by a thyristor interlock circuit 22.

In FIG. 2, the interlock circuit 22 is schematically illustrated and the drive motor 18 is schematically illustrated in the form of a box 17 which, in addition to representing the drive motor 18, also constitutes a representation of any suitable speed controller mechanism and/or reversing control mechanism. A controller switch 28 is connected to the speed controller mechanism by a suitable linkage 51 shown schematically in dotted line.

Included in the interlock circuit 22 is a solenoid switch 29 which includes an actuating coil 30 and which is preferably biased open by spring 31 so that the solenoid switch 29 will be open in the absence of an energizing current flow in the actuating coil 30. Means in the form of leads 19 and 33 provide for connection of the solenoid switch 29 and the DC motor 18 in series relation between a positive terminal 37 and a negative terminal 35 of the DC source 20. When the actuating coil 30 is energized, i.e. when energizing current of sufficient magnitude passes therethrough, the solenoid switch 29 closes, thereby completing the motor circuit between the positive and negative terminals of the direct current source and energizing the DC motor 18.

Included in the interlock circuit 22 is a thyristor 38 having an anode 39, a cathode 41, and a gate 43. Means in the form of a lead 34, preferably including an ignition switch 24, is provided for connecting the anode 39 to the positive terminal 37 of the DC source. Means in the form of a lead 42 including a current limiting resistor 44 connects a first or start switch 26 to the positive terminal 37 and to the gate 43. Although the start switch 26 could be separate from the ignition switch 24, and could be linked to other vehicle mechanisms, the start switch 26 is preferably connected to the ignition switch by a suitable linkage 27, shown schematically in dotted line, so that the start switch closes after closing of the ignition switch, and is normally biased to an open position, such as by spring 25. The ignition switch 24 and start switch 26 can, for example, be incorporated in a single spring bias rotary ignition/start switch.

Also included in the interlock circuit 22 is the controller switch 28 which includes two terminals labeled 45 and 47. Sub-circuit means 32 (described below) is provided for connecting the thyristor cathode 41 and the actuating coil 30 in series relation to the negative terminal 35 of the DC source, and for connecting one terminal 45 of the controller switch to the first switch 26 and the thyristor gate 43, and for connecting the other terminal 47 of the second switch to the thyristor cathode 41 and the actuating coil 30. As will be described in more detail below, the sub-circuit means forces an operator to sequentially close the first or start switch 26 to gate the thyristor 38 and close the second or controller switch 28 in order to energize the actuating coil 30, and hence the DC motor 18.

As shown in the illustrated construction in FIG. 2, the sub-circuit means 32 preferably comprises a first resistor 62 and a first lead 60 for connecting the resistor 62 and the actuating coil 30 in series relation between the thyristor cathode 41 and the negative terminal 35 of the DC source. Also included in the sub-circuit means is a second lead 64 connecting the terminal 45 of the controller switch 28 to the first switch 26 through resistor 44 and to the gate 43 through lead 42. A third lead 66 connects the other terminal 47 of controller switch 28 to the lead 60 between the first resistor 62 and the actuating coil 30. The sub-circuit means is completed by a fourth lead 68 including a second resistor 70 and a diode 72 connected in parallel relation. The fourth lead 68 connects the resistor 70 to the thyristor cathode 41 through lead 60 and to the gate 43 through lead 42, and connects the cathode 74 of the diode to the gate through lead 42 and the anode 76 of the diode to the thyristor cathode 41 through lead 60.

When the ignition switch 24, start switch 26, and the controller switch 28 are open, no current can flow from positive terminal 37 of the DC source through the solenoid actuater coil 30 to the negative terminal 35 of the DC source, and hence the solenoid switch 29 remains biased open and the drive motor 18 remains unenergized. When both the ignition switch 24 and the start switch 26 are closed (and the controller switch 28 is open) current flows through a series circuit including the start switch 26, the resistor 44, the resistor 70, the resistor 62, and the actuating coil 30. The current limiting resistor 44 is chosen to allow sufficient current to pass therethrough to gate the thyristor 38, but to prevent current flow sufficient to energize the actuating coil (assuming the thyristor is not gated) from flowing through the closed controller switch 28.

When the thyristor 38 is gated, a current larger than the thyristor holding current, but smaller than an amount sufficient to energize the actuating coil 30, flows through the series circuit consisting of the ignition switch 24, the thyristor 38, the resistor 62 and the actuating coil 30. The magnitude of the "above holding" current flow can be adjusted by varying the resistor 62 to insure that the current is larger than the thyristor holding current, but smaller than the amount of current necessary to energize the actuating coil 30. Thus, the above holding current flow will remain as a minimum thyristor current until the ignition switch is opened, even though the start switch 26 returns to its normally biased open position.

If the controller switch 28 is closed after the thyristor 38 has been gated, the resistor 62 is shorted out by the diode 72 and the controller switch 28 which are connected in series relation between the thyristor cathode and the actuating coil. Accordingly, current flowing through the thyristor 38 increases to a magnitude sufficient to energize the actuating coil 30, thereby resulting in the solenoid switch 29 being closed and the drive motor being energized. Operation remains normal until the ignition switch 24 is opened interrupting the current flow through the thyristor 38, de-energizing the drive motor and putting the vehicle out of operation.

If the ignition switch 24 is closed and the operator closes the controller switch 28, and then closes the start switch 26, the thyristor 38 will not be gated since the controller switch 28 bypasses the thyristor gate-cathode junction and thus prevents gating. Therefore, in order to energize the DC motor 18 and place the vehicle in operation, the operator must (assuming the ignition switch is closed) first close the first or start switch 26 in order to gate the thyristor 38 and then close the controller switch 28 in order to energize the actuating coil 30 and the DC motor.

Shown in FIG. 3 is a schematic view of an alternative embodiment of the invention wherein the interlock circuit 22 is modified to include indicator lights and to force an indicator light check. The thyristor interlock and indicator light circuit shown in FIG. 3 and designated 78, includes all of the elements of the circuit of FIG. 2, connected in the same manner, except as will be noted in the description below.

As shown in the illustrated construction, the circuit 78 further includes a third switch 80 normally closed when a given vehicle condition is satisfied. The third switch is preferably a motor temperature switch 80 which is normally closed when the motor is operating within a normal temperature range. A first indicator light 82 is connected in series relation with the temperature switch 80 between the thyristor cathode 41 and the negative terminal 35 of the power source by means in the form of a lead 84. The circuit 78 preferably includes a transistor 86 including a collector 88, an emitter 90, and a base 92. A second light 94 is connected in series relation with the collector emitter path between the ignition switch 24 and the terminal 35 of the power source by means in the form of a lead 96. Second sub-circuit means in the form of a lead 98, including resistors 100 and 102, extends in series relation between the base 92 and lead 84 connected to the lamp 82 and the motor temperature switch 80. The second sub-circuit means is completed by a lead 106, preferably including a diode 108, which extends between the starter switch 26 and connects to the lead 98 between resistors 100 and 102. Diode 110 is preferably included in lead 42 between the start switch 26 and resistor 44 to prevent positive feedback from the actuating coil 30 influencing the switching of transistor 86, and the diode 108 is included in the lead 106 to prevent negative feed-back interference.

For purposes of the description of operation, the first indicator light 82 will be referred to as the green light 82 and the second light 94 will be referred to as the red light 94. When an operator closes the ignition switch 24 and the start switch 26, the thyristor 38 is gated and current supplied by the current source flows through the series circuit including the green light and motor temperature switch 80 to negative terminal 35, thereby turning the green light 82 on. At the same time, the lead 106 including diode 108 provides a positive bias through resistor 100 to the base of transistor 86 which turns on, and hence, current flows from the ignition switch 24 through the series circuit including the lead 96, the red lamp 94, and the transistor 86 to the negative terminal 35 of the power source, thereby turning the red lamp 94 on. Thus, there is a check of the green light and red light and its driver transistor 86 whenever the ignition switch and start switch are closed, and the vehicle is placed in operation.

After the start switch 26 returns to its normally biased open position, the transistor 86 is cut off since no positive base bias is conveyed through lead 106 and the red light 94 turns out. The green light 82 remains on during normal operation of the vehicle.

If, during operation, the motor overheats so that the motor temperature switch 80 opens, the current flowing through the green light 82 will be substantially diminished so that the green light will go out or its light intensity will be substantially reduced. Transistor 86 will, however, receive a relatively small base current which flows from the thyristor through the green lamp through resistors 102 and 100. This base current will turn transistor 86 on and hence, the red lamp 94 will be turned on as previously described, thereby alerting the operator that the motor is in an overheated condition.

Shown in FIG. 4 is a schematic view of an alternative embodiment of the invention wherein a thyristor interlock circuit 120 is provided to prevent inadvertent operation of the vehicle while in reverse. The circuit 120 includes several of the same elements designated with the same numerals as in the circuit 22 shown in FIG. 2. Modification in switching and changes in the connection of some of the elements will be noted in the description below.

The circuit 120 shown in FIG. 4 varies from the circuit 22 previously described in that lead 34 includes a seat switch 122 connected in series with the ignition switch 124. Instead of a start switch linked to the ignition switch, the circuit 120 includes a transmission switch 126 which is linked to a vehicle transmission (not shown) so as to be open when the vehicle transmission is in reverse, and so as to be closed when the transmission has been shifted to forward or neutral.

For purposes of description of the invention, it is to be understood that the term "transmission switch" encompasses any suitable vehicle direction controlling switch linked to a suitable vehicle transmission. The term "vehicle transmission" encompasses any suitable electrical or mechanical vehicle reversing control or reversing mechanism. The transmission switch or vehicle direction controlling switch is linked to the vehicle transmission or reversing control so as to be open when the vehicle transmission is in reverse, or when the vehicle is enabled in reverse, and so as to be closed when the transmission is in forward or neutral, or when the vehicle is not enabled in reverse.

The circuit 120 also includes sub-circuit means 128 which differs from the sub-circuit means described in circuit 22 in that diode 72 is eliminated from lead 68 and in that the terminal 45 of the controller switch 28 is connected by lead 64 to the gate 43 and the resistor 44 through the resistor 70. This change in connection eliminates the necessity that the transmission switch 126 and the controller switch 28 be sequentially operated in order to energize the DC motor since the controller switch 28 no longer bypasses the thyristor gate-cathode junction.

If an operator sits on the seat 14 (closing seat switch 122) and turns on the ignition switch 124, the thyristor 38 will be gated if the transmission switch 126 is in neutral or forward. In that case, operating the controller switch 28 will energize the actuating coil 30 normally through the thyristor and the controller switch. After the thyristor has been gated, shifting to reverse, and hence opening the transmission switch 126, will not hinder operation as the resistor 62 and the actuating coil 30 provide a path for a holding current, and hence vehicle operation in forward and reverse will be normal.

If the operator leaves the seat, however, the seat switch 122 opens, the holding current is interrupted, and the thyristor turns off so that the motor is deenergized. If the transmission switch is left in reverse, and the operator again sits on seat 14, actuating the ignition switch 124 and the controller switch 28 will have no effect since the thyristor is not gated. It will be necessary for the operator to shift to forward or neutral thereby closing transmission switch 126 in order to gate the thyristor before operation in reverse is possible. Subsequent closing of the controller switch will result in energizing the DC motor and normal operation of the vehicle will follow.

It is to be understood that the invention is not confined to the particular construction and arrangement of parts herein illustrated and described, but embraces all such modified forms thereof, as come within the scope of the following claims. For example, the circuit 22 of FIG. 2 could be modified by the addition of a seat switch coupled in series with the ignition switch and/or by the addition of a transmission switch coupled in series with the start switch. An operator would thereby be required to be seated and/or to shift to neutral or forward before the motor could be energized as previously described.

Various of the features of the invention are set forth in the following claims.

What is claimed is:

1. A thyristor interlock circuit for energizing a DC motor, which circuit comprises a solenoid switch including an actuating coil, means for connecting said solenoid switch and the motor in series relation between the terminals of a DC source, a thyristor having an anode, a cathode, and a gate, means for connecting said anode to one terminal of the DC source, a first switch, means for connecting said first switch to the one terminal of the DC source and to said gate, a second switch including two terminals, and sub-circuit means for connecting said cathode and said actuating coil in series relation to the other terminal of the DC source, and for connecting one terminal of said second switch to said first switch and said gate, and for connecting the other terminal of said second switch to said cathode and said actuating coil, said sub-circuit means forcing an operator to sequentially close said first switch in order to gate said thyristor and close said second switch in order to energize said actuating coil and the DC motor.

2. A thyristor interlock circuit in accordance with claim 1 wherein said sub-circuit means comprises a first lead including a first resistor connecting said actuating coil in series relation between said thyristor cathode and the other terminal of the DC source, a second lead connecting said one terminal of said second switch to said first switch and to said gate, a third lead connecting said other terminal of said second switch to said first lead between said first resistor and said actuating coil, a fourth lead including a second resistor and a diode connected in parallel relation, said fourth lead connecting said resistor between said gate and said thyristor cathode, and connecting the cathode of said diode to said gate and the anode of said diode to said thyristor cathode.

3. A thyristor interlock circuit in accordance with claim 2 wherein said means for connecting said thyristor anode to said one terminal of the DC source includes an ignition switch connected in series between said anode and said one terminal of the DC source, wherein said means for connecting said first switch to the one terminal of the DC source and to said gate includes resistance means for limiting the gate current, and wherein said first switch comprises a start switch normally biased to an open position, said start switch being linked to said ignition switch to close after closing of said ignition switch, and wherein said second switch comprises a switch in a vehicle controller, whereby said circuit prevents energizing the DC motor by closing said controller switch, unless said ignition switch is closed and said start switch has been closed before said controller switch is closed.

4. A thyristor interlock circuit in accordance with claim 2 wherein said means for connecting said thyristor anode to said one terminal of the DC source includes an ignition switch connected in series between said anode and said one terminal of the DC source, wherein said means for connecting said first switch to the one terminal of the DC source and to said gate includes resistance means for limiting the gate current, and wherein said first switch comprises a transmission switch linked to a vehicle transmission so as to be open when the vehicle is enabled in reverse and so as to be closed when the vehicle is not enabled in reverse, and wherein said second switch comprises a switch in a vehicle controller, whereby said circuit prevents energizing the DC motor by closing said controller switch, unless said ignition switch is closed and said transmission switch has been closed before said controller switch is closed.

5. A thyristor interlock circuit in accordance with claim 3 for forcing an indicator light check, said circuit further comprising a third switch normally closed when a given vehicle condition is satisfied, a first light, means for connecting said third switch and said first light in series relation between said thyristor cathode and said other terminal of the power source, a transistor including a collector, an emitter and a base, a second light, means for connecting said second light in series relation with said collector and said emitter between said ignition switch and said other terminal of the power source, and second subcircuit means for connecting said base to said start switch and to said first light so that said transistor and said first and second lights turn on when said ignition switch and said start switch are closed, so that said second light and transistor turn off when said start switch is thereafter opened, and so that said third switch and said first light turn off and said transistor and said second light turn on when said given vehicle condition is not satisfied, thereby indicating an abnormal vehicle condition during operation of the DC motor.

6. A thyristor interlock circuit in accordance with claim 5 wherein said means for connecting said start switch to said gate includes a lead having a diode to block positive feedback from said actuating coil influencing said transistor, wherein said second sub-circuit means comprises a first lead including a first resistor and a second resistor connected in series relation between said base and said first lamp, and a second lead including a diode having an anode connected to said start switch and a cathode connected to said first lead between said first and second resistors.

7. A vehicle including a source of direct current having opposed terminals, a DC motor, and a thyristor interlock circuit for energizing said DC motor, said circuit comprising a solenoid switch including an actuating coil, means for connecting said solenoid switch and said motor in series relation between said opposed terminals of said DC source, a thyristor having an anode, a cathode, and a gate, means including an ignition switch for connecting said anode to one terminal of said DC source, a start switch normally biased to an open position, said start switch being linked to close after closing of said ignition switch, means for connecting said start switch to the one terminal of said DC source and to said gate and including resistance means for limiting the gate current, a controller having a switch with two terminals, and sub-circuit means comprising a first lead including a first resistor and connecting said resistor and said actuating coil in series relation between said thyristor cathode and said other terminal of said DC source, a second lead connecting one terminal of said controller switch to said start switch and said gate, a third lead connecting the other terminal of said controller switch to said first lead between said first resistor and said actuating coil, a fourth lead including a second resistor and a diode connected in parallel relation, said fourth lead connecting said resistor between said gate and said thyristor cathode, and connecting the cathode of said diode to said gate and the anode of said diode to said thyristor cathode, said sub-circuit means forcing an operator to close said ignition switch and said start switch in order to gate said thyristor and then to close said controller switch in order to energize said actuating coil and said DC motor.

8. A vehicle in accordance with claim 7 wherein said thyristor interlock circuit forces an indicator light check, and further comprises a third switch normally closed when a given vehicle condition is satisfied, a first light, means for connecting said third switch and said first lamp in series relation between said thyristor cathode and said other terminal of the power source, a transistor including a collector, an emitter and a base, a second light, means for connecting said second light is series relation with said collector and emitter between said ignition switch and said other terminal of the power source, and second sub-circuit means comprising a first lead including a first resistor and a second resistor for connecting said base and said first lamp, and a second lead including a diode having an anode connected to said start switch and a cathode connected to said first lead between said first and second resistors, said second sub-circuit means insuring that said transistor and said first and second lights turn on when said ignition switch and said start switch are closed, that said second light and transistor turn off when said start switch is thereafter opened, and that said third switch and said first light turn off and said transistor and said second light turn on when said given vehicle condition is not satisfied, thereby indicating an abnormal vehicle condition during operation of the DC motor.

9. A vehicle in accordance with claim 8 wherein said third switch comprises a motor temperature switch normally closed when said motor temperature is normal and which opens when said motor temperature is abnormal, whereby said circuit indicates an overheated motor condition.

10. A thyristor interlock circuit for energizing a DC motor, which circuit comprises a solenoid switch including an actuating coil, means for connecting said solenoid switch and the motor in series relation between the terminals of a DC source, a thyristor having an anode, a cathode, and a gate, means including a first switch connected in series relation between said anode and one terminal of the DC source, a transmission switch linked to a vehicle transmission so as to be open when the vehicle is enabled in reverse and so as to be closed when the vehicle is not enabled in reverse, means for connecting said transmission switch to the one terminal of the DC source and to said gate, a controller switch including two terminals, and sub-circuit means for connecting said cathode and said actuating coil in series relation to the other terminal of the DC source, and for connecting one terminal of said controller switch through a resistor to said transmission switch and to said gate, and for connecting the other terminal of said controller switch to said cathode and said actuating coil, said sub-circuit means forcing an operator to close said first switch and said transmission switch in order to gate said thyristor and to close said controller switch in order to energize said actuating coil and the DC motor.

11. A thyristor interlock circuit in accordance with claim 10 wherein said first switch comprises an ignition switch and wherein said means including said first switch further includes a seat switch connected in series relation with said ignition switch, wherein said means for connecting said transmission switch includes resistance means for limiting the gate current, and wherein said sub-circuit means comprises a first lead including a first resistor connecting said actuating coil in series relation between said thyristor cathode and the other terminal of the DC source, a second lead including a second resistor connecting said one terminal of the controller switch to said transmission switch and to said gate, a third lead connected to said other terminal of said controller switch and to said first lead between said first resistor and said actuating coil, and a fourth lead connecting said second resistor between said gate and said thyristor cathode, whereby said circuit prevents energizing the DC motor unless said ignition switch and said seat switch are closed, and said transmission switch is closed to gate said thyristor.

12. A vehicle including a source of direct current having opposed terminals, a transmission, a DC motor, and a thyristor interlock circuit for energizing a DC motor, comprising a solenoid switch including an actuating coil, means for connecting said solenoid switch and said motor in series relation between said terminals of said DC source, a thyristor having an anode, a cathode, and a gate, means including an ignition switch and a seat switch connected in series relation between said anode and one terminal of the DC source, a transmission switch linked to said vehicle transmission so as to be open when the vehicle is enabled in reverse and so as to be closed when the vehicle is not enabled in reverse, means including a current limiting resistance for connecting said transmission switch to the one terminal of the DC source and to said gate, a controller switch including two terminals, and sub-circuit means comprising a first lead including a first resistor connecting said actuating coil in series relation between said thyristor cathode and the other terminal of the DC source, a second lead including a second resistor connecting one terminal of said controller switch to said transmission switch and to said gate, a third lead connecting the other terminal of said controller switch to said first lead between said first resistor and said actuating coil, and a fourth lead connecting said second resistor between said gate and said thyristor cathode, said sub-circuit means forcing an operator to close said ignition and seat switch and to shift from reverse into one of forward and neutral in order to gate said thyristor and to close said controller switch in order to energize said actuating coil and said DC motor.

13. A thyristor interlock circuit for energizing a DC motor, which circuit comprises a solenoid switch including an actuating coil, means for connecting said solenoid switch and the motor in series relation between the terminals of a DC source, a thyristor having an anode, a cathode, and a gate, means for connecting said anode to one terminal of the DC source, a first switch, means for connecting said first switch to the one terminal of the DC source and to said gate, a second switch including two terminals, and sub-circuit means connected in circuit with said thyristor and said actuating coil and said first and second switches for forcing an operator to sequentially close said first and second switches in order to energize the DC motor.

14. A thyristor interlock circuit for energizing a DC motor, which circuit comprises a solenoid switch including an actuating coil, means for connecting said solenoid switch and the motor in series relation between the terminals of a DC source, a thyristor having an anode, a cathode, and a gate, means including a first switch connected in series relation between said anode and one terminal of the DC source, a transmission switch linked to a vehicle transmission so as to be open when the vehicle is enabled in reverse and so as to be closed when the vehicle is not enabled in reverse, means for connecting said transmission switch to the one terminal of the DC source and to said gate, a controller switch including two terminals, and sub-circuit means connected in circuit with said thyristor and said actuating coil and said controller and transmission switches for forcing an operator to close said first switch and said transmission switch in order to gate said thyristor and to close said controller switch in order to energize said actuating coil and the DC motor.

* * * * *